United States Patent [19]

Flygare et al.

[11] Patent Number: 4,990,807
[45] Date of Patent: Feb. 5, 1991

[54] INTEGRATED DRIVE GENERATOR HAVING MAGNET GENERATOR ON SECOND SHAFT

[75] Inventors: Wayne A. Flygare; Richard C. Welch, both of Rockford, Ill.

[73] Assignee: Sundstrand Corporation, Rockford, Ill.

[21] Appl. No.: 409,397

[22] Filed: Sep. 19, 1989

[51] Int. Cl.$^5$ .............................................. H02K 19/26
[52] U.S. Cl. ................................ 310/68 D; 310/112
[58] Field of Search ............. 290/1 C; 310/68 D, 112, 310/114, 89; 322/29

[56] References Cited

U.S. PATENT DOCUMENTS

| | | |
|---|---|---|
| 3,908,130 | 9/1975 | Lafuze . |
| 3,908,161 | 9/1975 | Messenger . |
| 4,252,035 | 2/1981 | Cordiner et al. . |
| 4,609,842 | 9/1986 | Aleem et al. .................. 310/112 |
| 4,661,735 | 4/1987 | Miki et al. .................... 310/112 |
| 4,663,581 | 5/1987 | Glennon . |
| 4,728,841 | 3/1988 | Sugden . |
| 4,743,776 | 5/1988 | Baehler et al. . |
| 4,755,736 | 7/1988 | Fleugel . |
| 4,772,802 | 9/1988 | Glennon et al. . |
| 4,797,590 | 1/1989 | Raad et al. ................. 310/68 D |

*Primary Examiner*—Steven L. Stephan
*Assistant Examiner*—D. L. Rebsch
*Attorney, Agent, or Firm*—Antonelli, Terry, Stout & Kraus

[57] ABSTRACT

An integrated drive generator (40) for generating constant frequency alternating current which is driven by a drive shaft (12) at variable rotational speeds includes a constant speed drive having an input coupled to the drive shaft and at least one output which rotates at a fixed rotational velocity in response to the drive shaft rotating at a variable velocity and which drives a first drive shaft at a fixed rotational velocity and a second drive shaft at a fixed rotational velocity, an alternating current generator (23), having a rotor (37) mounted on a first shaft (42), with an outside periphery having a second radius farthest from an axis of rotation of the first shaft; an exciter (20) having a rotor (32) mounted on the first shaft, electrically coupled to a field winding of the generator, for supplying electrical power to the field winding of the alternating current generator; a permanent magnet generator (18), having a rotor (24) mounted on the second shaft, electrically coupled to the exciter, for supplying electrical power to a field winding of the exciter, with an outside periphery having a second radius farthest from an axis of rotation of the second shaft and wherein a sum of the first and second radii is greater than a distance between axes of rotation of the shafts.

23 Claims, 3 Drawing Sheets

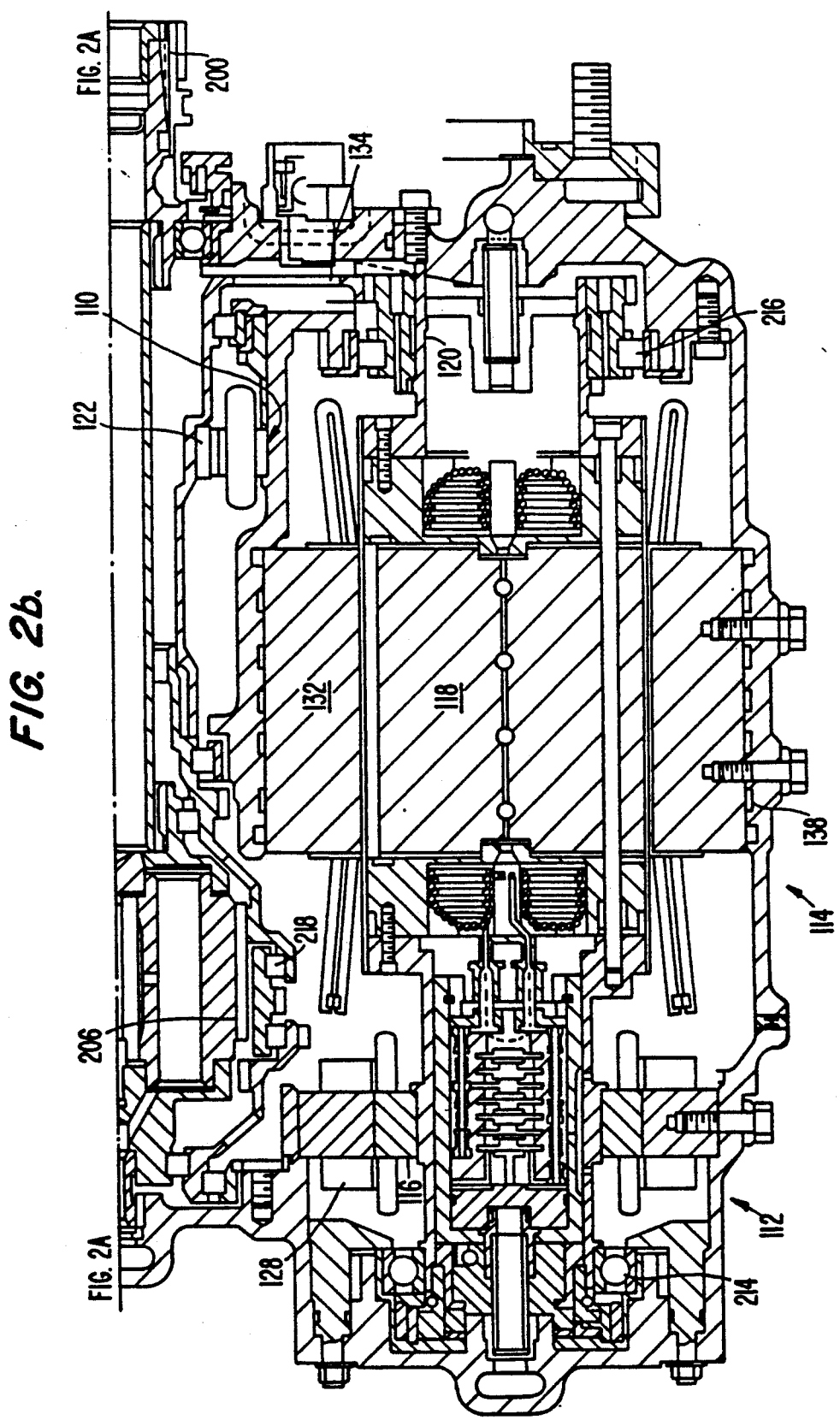

INTEGRATED DRIVE GENERATOR HAVING MAGNET GENERATOR ON SECOND SHAFT

CROSS REFERENCE TO RELATED APPLICATIONS

Reference is made to Ser. No. 324,755, filed on Mar. 17, 1989, which is assigned to the assignee of the present application. Application Ser. No. 324,755 is incorporated by reference herein in its entirety.

TECHNICAL FIELD

The present invention relates to integrated drive generators for generating constant frequency alternating current having a main generator and exciter mounted on a first shaft driven at a constant velocity and a permanent magnet generator mounted on a second shaft driven at a constant velocity.

BACKGROUND ART

U.S. Pat. No. 4,743,776, which is assigned to the assignee of the present invention, discloses an integrated drive generator for use in an airframe having a constant speed drive transmission which drives a first shaft rotationally supporting an exciter and main generator and a second shaft rotationally supporting a permanent magnet generator. The permanent magnet generator is axially aligned with the main generator which increases the necessary spacing between the first and second shafts to provide rotary clearance between the main generator and the permanent magnet generator. This increased spacing between the first and second shafts results in gear drives interconnecting a hydraulic pump-motor assembly with an input shaft and the first and second shafts having an increased diameter with a concomitant weight penalty. Additionally, the increased spacing between the first and second shafts enlarges the outside periphery of the housing with a concomitant weight penalty. Furthermore, the overall length of the housing of integrated drive generator is determined by the combined length of the first shaft and a torque converter mounted at one end of the first shaft. The second shaft is connected to a first side of a differential which is part of the constant speed drive transmission. The input shaft from a turbine engine is connected to the second side of the differential. Placement of the permanent magnet generator on the first side of the differential was not a determining factor in the overall length of the housing of the integrated drive generator.

The weight and size of an integrated drive generator is of extreme importance in the design of airframes. Unnecessary weight lessens the overall efficiency of the airframe and its load carrying capability. Increased size either in terms of length or increased peripheral dimension in an integrated drive generator can interfere with the mounting of the integrated drive generator on the propulsion engine as a consequence of interference between the integrated drive generator and the cowling of the engine. Reducing weight reduces overhung moment which lessens the requirement for reinforcing of the mounting flange on the propulsion engine where the integrated drive generator is attached.

DISCLOSURE OF INVENTION

The present invention provides an integrated drive generator for generating constant frequency alternating current having reduced weight and peripheral dimension which is particularly suited for applications of generating constant frequency alternating current in airframes. With the invention, the wound field exciter and main generator are mounted on a first shaft driven at a constant speed by an output of a constant speed drive transmission and a permanent magnet generator is mounted on a second shaft also driven at a constant speed by an output of the constant speed drive transmission with the spacing between the shafts being less than a sum of the peripheral radii of the permanent magnet generator and the main generator. The constant speed drive has a differential having first input which is driven at a variable speed which is coupled to a first side of the differential. The output of the constant speed drive extends from the first side also. Preferably, the first input and the output are coaxial.

Placing the rotors of the wound field exciter and the main generator on a first shaft and the rotor of the permanent magnet generator on a second shaft with the first input and output coaxial and coupled to a first side of the differential has a number of advantages. First, the rotor of the main generator may be a longer lighter two pole design. The increased space available on the first shaft obtained by mounting the permanent magnet generator on the second shaft permits a longer lighter two pole rotor to be mounted on the first shaft while shortening the overall length of the case which lightens the integrated drive generator from the conventional configuration where all generators are on the same shaft. The length of the first shaft supporting the main generator and wound field exciter between bearings within the case may be shortened from the length of the integrated drive generator disclosed in U.S. Pat. No. 4,743,776. Preferably, the second shaft on which the rotor of the permanent magnet generator is mounted is driven at a speed less than the speed at which the first shaft is driven on which the rotors of the wound field exciter and main generator are mounted. Driving the permanent magnet generator at a lower speed permits a permanent magnet generator, with a greater number of poles and a larger diameter, to be used which reduces the overall length of the permanent magnet generator facilitating it being mounted on an output of a constant speed drive transmission without lengthening the case of the integrated drive generator or interfering with an outside periphery of the main generator. Bearings in the differential of the constant speed drive transmission are used for supporting the second shaft which reduces weight by not requiring an additional set of bearings.

An integrated drive generator for generating constant frequency alternating current which is driven by a drive shaft at variable rotational speeds in accordance with the invention includes a constant speed drive having an input coupled to the drive shaft and an output which rotates at a fixed rotational velocity in response to the drive shaft rotating at a variable velocity and which drives a first drive shaft at a fixed rotational velocity and a second drive shaft at a fixed rotational velocity; an alternating current generator for generating the constant frequency alternating current having a rotor mounted on the first shaft with an outside periphery having a first radius farthest from an axis of rotation of the first shaft; an exciter having a rotor mounted on the first shaft, electrically coupled to a field winding of the alternator, for supplying electrical power to a field winding of the alternating current generator; a generator, having a rotor mounted on the second shaft, electrically coupled to the exciter, for supplying electrical power to a field winding of the exciter with an outside periphery having a second radius farthest from an axis of rotation of the second shaft; and wherein a sum of the first and second radii is greater than a distance between the axes of rotation of the shafts. The output of the constant speed drive driving the first and second shafts is the same output. Preferably, the generator, having the rotor mounted on the second shaft, has a permanent magnet rotor.

The constant speed drive comprises a hydraulic pump and motor having an input shaft coupled to the drive shaft and an output; and a differential with a first input coupled to the drive shaft and an output coupled to a first side of the differential, a second input coupled to the output of the hydraulic pump and motor and an output which is the output of the constant speed drive driving the first and second shafts and which is coupled to the first side of the differential. The first input and output are coaxial. The output of the hydraulic pump and motor is coupled to a first ring gear; the output of a constant speed drive is coupled to a second ring gear and drives a gear connected to the second shaft which drives a gear connected to the first shaft; and the first ring gear is coupled to the second ring gear by a plurality of planetary gears. The integrated drive generator has a case containing first and second pairs of bearings for respectively rotationally supporting the first and second shafts, the main generator and exciter being disposed between the first pair of bearings and the output of the differential and the rotor of the permanent magnet generator being supported by the second pair of bearings.

BRIEF DESCRIPTION OF THE DRAWINGS

FIGS. 2a and 2b illustrate a preferred embodiment of an integrated drive generator in accordance with the present invention.

BEST MODE FOR CARRYING OUT THE INVENTION

U.S. Patent application Ser. No. 324,755, filed on Mar. 17, 1989, which is assigned to the assignee of the present application, discloses an integrated drive generator having a constant speed transmission which drives a first shaft rotationally supporting an excitor and main generator and a second shaft rotationally supporting a permanent magnet generator. The integrated drive generator disclosed in Ser. No. 324,755 has the main generator and permanent magnet generator in overlapping axial positions which requires that the axes of rotation be offset a distance greater than the sum of the outside radii of the main generator and permanent magnet generator. The overall outside peripheral dimension and weight of the housing is influenced by the distance between the two shafts. Furthermore, the increased spacing between the first and second shafts of the integrated drive generator disclosed in Ser. No. 324,755 results in a weight penalty as a consequence of increased diameter of gears in the gear drives.

Figure 1:
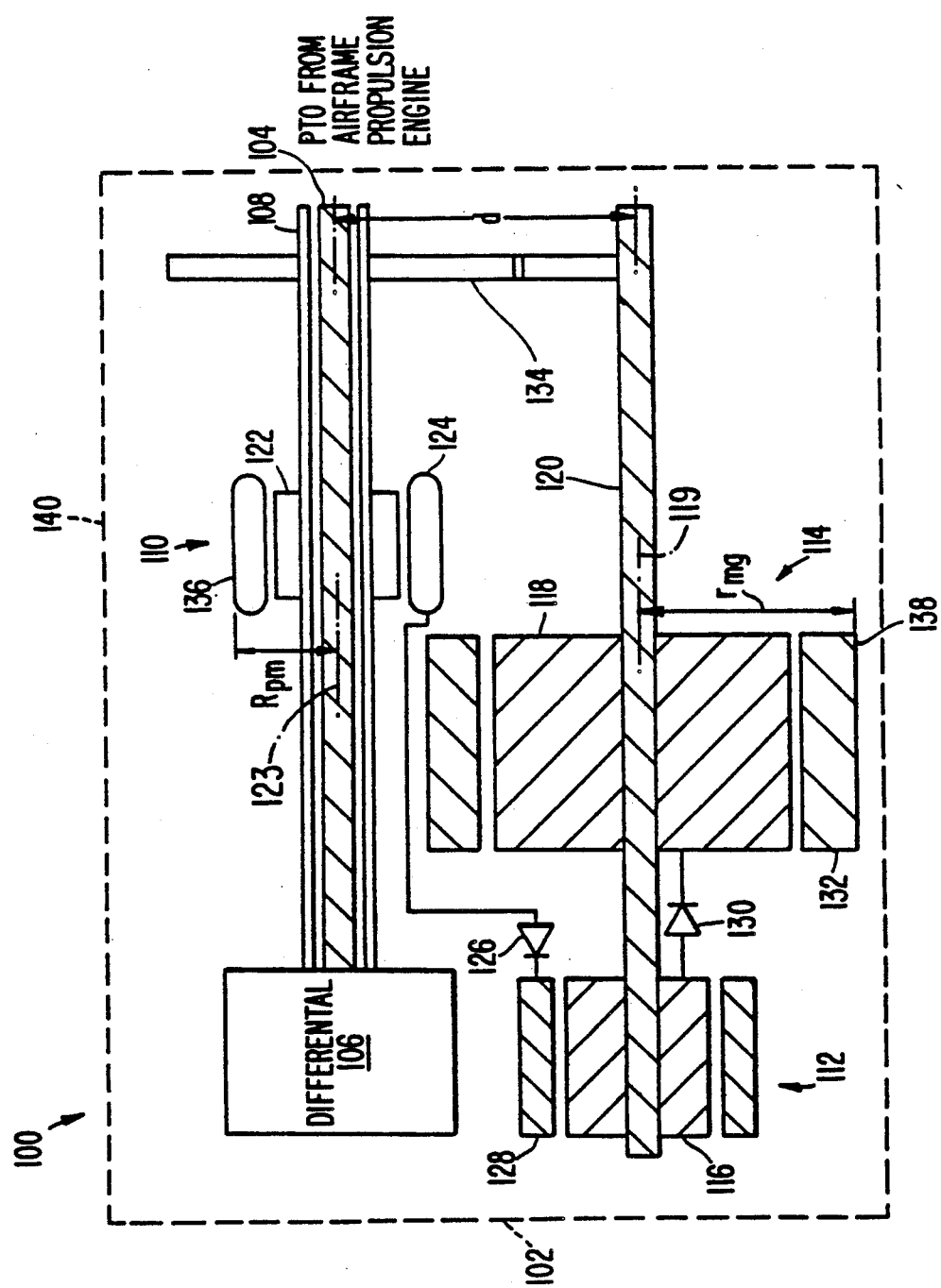
FIG. 1 illustrates a block diagram of an integrated drive generator in accordance with the present invention.

FIG. 1 illustrates a block diagram of an integrated drive generator 100 in accordance with the present invention. Integrated drive generators which are manufactured by the assignee of the present invention generate three phase 400 Hertz 120 volt alternating current in airframes from a variable speed power takeoff from an airframe propulsion engine. The power takeoff 104 is coupled to a differential 106 within a constant speed drive transmission which produces a constant speed output on shaft 108 while the rotational speed of the power takeoff varies. The constant speed drive transmission is conventional. Furthermore, the connection of the differential 106 to the shafts 104 and 108 is illustrated only schematically. The integrated drive generator 100 has a permanent magnet generator 110, wound field exciter 112 and main generator 114 each of conventional construction. The rotors 116 and 118 respectively of the wound field exciter 112 and main generator 114 are mounted on a first shaft 120 which is supported by bearings (not illustrated) which are mounted in housing 102 of the integrated drive generator. The housing is illustrated only schematically by a dotted line with it being understood that in practice it has a complicated outside surface such as illustrated in FIG. 3 discussed below. The permanent magnet generator 110 has a permanent magnet rotor 122 mounted on the shaft 108. The stator 124 of the permanent magnet generator 110 outputs alternating current which is rectified by rectifier 126 to produce field excitation current which is applied to the stator 128 of the wound field exciter 112. The rotor 116 of the wound field exciter 112, mounted on the first shaft 120, outputs alternating current which is rectified by rectifier 130. Rectified current from the rectifier 130 is applied to the field windings of the rotor 118 of the main generator 22. The stator 132 outputs three phase 400 Hz. 120 volt alternating current for use in powering the various electrical loads on an airframe. A fixed speed ratio of 2 to 1 between the rotary velocity of shafts 120 and 108 is maintained by gear drive 134. The bearing support (not illustrated) for the permanent magnet generator 110 utilizes the bearing support for the differential 106 of the constant speed drive which results in a weight savings if the second shaft 108 was supported with only the bearings supporting the permanent magnet generator 110.

The present invention differs from the integrated drive generator disclosed in U.S. Pat. No. 4,743,776 and Ser. No. 324,755 in that the first shaft 120 and the second shaft 108 are spaced apart in the case 102 by a distanced less than the sum of the radius $r_{pm}$, which is the radius to a point on the periphery 136 farthest from the axis of rotation 123 of the rotor 122 of the permanent magnet generator, and of the radius $m_{mg}$, which is the radius to a point on the periphery 138 farthest from the axis of rotation 119 of the rotor 118 of the permanent magnet generator. When the shafts 108 and 120 are located in the case 102 with the foregoing spacing the outside periphery 140 of the case 102 is reduced which reduces weight of the integrated drive generator. Weight reduction reduces overhung moment and increases operational efficiency of an airframe. Reducing the outside peripheral dimension reduces frontal area and simplifies mounting on the propulsion engine and with respect to its cowling.

Figure 2A:
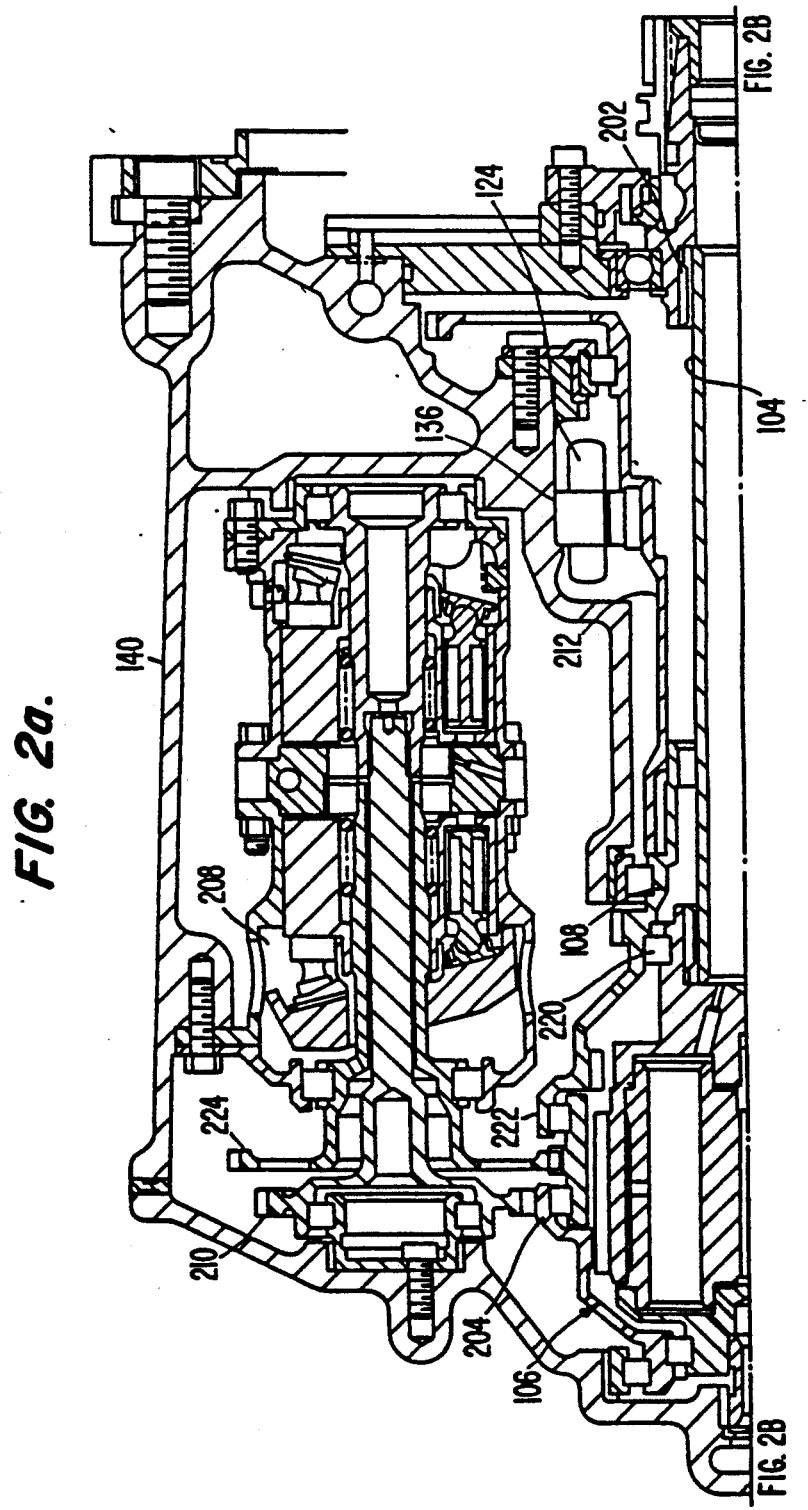

FIGS. 2a and 2b illustrate a preferred embodiment of the present invention. Like reference numerals in FIGS. 1 and 2a and 2b identify like parts. Differential 106, which is of convention construction, has a first input 104, connected to shaft 200 by a splined coupling 202, a second input 204 from a pair of conventional hydraulic pump-motor assemblies 208 and an output 108 which includes a first ring gear 222. The output 108 is connected to the second shaft 120 by gear drive 134. Planetary gears 206 couple the second input 204, which is a second ring gear, to the output 108 in a conventional fashion. The pair of conventional hydraulic pump-motor assemblies 208 are driven from input 200 by a gear drive 224. The hydraulic pump-motor assemblies drive output 210 to drive the second input 204 of the differential in conventional fashion to produce the drive of the output 108 at constant speed independent of velocity changes in the input 200 from the airframe propulsion engine. The output 108 drives gear drive 134 attached to shaft 212. The gear ratio between the gears of the gear drive 134 is greater than unity and as illustrated is two to one. The shaft 120 is rotationally supported by bearings 214 and 216. The output 108 is supported by the bearings 218 and 220 which also support the differential 106. The input 104 and the output 108 are connected to a first side of differential 106 of the constant speed drive.

The closer spacing between the axis of rotation of the shafts 108 and 120 obtained by the foregoing radial relationship reduces the diameter of the output ring gear 222 which permits the hydraulic pump and motor assemblies 208 to be positioned closer to the centerline of the input shaft 200, permitting the housing periphery in the vicinity of the hydraulic pump and motor assemblies 208 to be reduced with a concomitant weight savings. The closer spacing also permits the diameter of the planetary gears 206, gears 210 and 224 and the gears of gear drive 134 to be reduced. A weight savings of approximately two pounds in a commercial unit of approximately 84 pounds is a result of the closer spacing.

While the invention has been described in terms of its preferred embodiment, it should be understood that numerous modifications may be made thereto without departing from the spirit and scope of the present invention as defined in the appended claims. It is intended that all such modifications fall within the scope of the appended claims.

We claim:

1. An integrated drive generator for generating constant frequency alternating current which is driven by a drive shaft at variable rotational speeds comprising:
   a constant speed drive having a first input coupled to the drive shaft and an output which rotates at a fixed rotational velocity in response to the drive shaft rotating at a variable velocity and which drives a first drive shaft at a fixed rotational velocity and a second drive shaft at a fixed rotational velocity;
   an alternating current generator for generating the constant frequency alternating current having a rotor mounted on the first shaft with an outside periphery having a first radius farthest from an axis of rotation of the first shaft;
   an exciter having a rotor mounted on the first shaft, electrically coupled to a field winding of the alternator, for supplying electrical power to the field winding;
   a generator, having a rotor mounted on the second shaft, electrically coupled to the exciter, for supplying electrical power to a field winding of the exciter with an outside periphery having a second radius farthest from an axis of rotation of the second shaft; and wherein
   a sum of the first and second radii is greater than a distance between axes of rotation of the shafts.

2. An integrated drive generator in accordance with claim 1 wherein:
   the generator, having a rotor mounted on the second shaft, has a permanent magnet rotor.

3. An integrated drive generator in accordance with claim 2 wherein the constant speed drive comprises:
   a hydraulic pump and motor having an input shaft coupled to the drive shaft and an output; and
   a differential with a first input coupled to a first side of the differential and to the drive shaft, a second input coupled to the output of the hydraulic pump and motor and an output which is the output of the constant speed drive driving the first and second shafts and is coupled to the first side of the differential.

4. An integrated drive generator in accordance with claim 2 wherein:
   the first input and the output are coaxial.

5. An integrated drive generator in accordance with claim 3 wherein:
   the first input and the output of the differential are coaxial.

6. An integrated drive generator in accordance with claim 4 wherein:
   the output of the hydraulic pump and motor is coupled to a first ring gear;
   the output of the constant speed drive is coupled to a second ring gear and drives a gear connected to the second shaft which drives a gear connected to the first shaft; and
   the first ring gear is coupled to the second ring gear by a plurality of planetary gears.

7. An integrated drive generator in accordance with claim 2 wherein:
   the integrated drive generator has a case containing first and second pairs of bearings for respectively rotationally supporting the first and second shafts, the main generator and exciter being disposed between the first pairs of bearings and the output of a differential and the rotor of the permanent magnet generator are supported by the second pair of bearings.

8. An integrated drive generator in accordance with claim 3 wherein:
   the integrated drive generator has a case containing first and second pairs of bearings for respectively rotationally supporting the first and second shafts, the main generator and exciter being disposed between the first pairs of bearings and the output of the differential and the rotor of the permanent magnet generator are supported by the second pair of bearings.

9. An integrated drive generator in accordance with claim 4 wherein:
   the integrated drive generator has a case containing first and second pairs of bearings for respectively rotationally supporting the first and second shafts, the main generator and exciter being disposed between the first pairs of bearings and the output of the differential and the rotor of the permanent magnet generator are supported by the second pair of bearings.

10. An integrated drive generator in accordance with claim 5 wherein:
    the integrated drive generator has a case containing first and second pairs of bearings for respectively rotationally supporting the first and second shafts, the main generator and exciter being disposed between the first pairs of bearings and the output of the differential and the rotor of the permanent magnet generator are supported by the second pair of bearings.

11. An integrated drive generator in accordance with claim 5 wherein:
the ratio of the velocities of the first shaft to the second shaft is two to one.

12. An integrated drive generator in accordance with claim 6 wherein:
the ratio of the velocities of the first shaft to the second shaft is two to one.

13. An integrated drive generator in accordance with claim 2 wherein:
the alternating current generator rotor has two poles and the generator with a permanent magnet rotor has twelve poles.

14. An integrated drive generator in accordance with claim 3 wherein:
the alternating current generator rotor has two poles and the generator with a permanent magnet rotor has twelve poles.

15. An integrated drive generator in accordance with claim 4 wherein:
the alternating current generator rotor has two poles and the generator with a permanent magnet rotor has twelve poles.

16. An integrated drive generator in accordance with claim 5 wherein:
the alternating current generator rotor has two poles and the generator with a permanent magnet rotor has twelve poles.

17. An integrated drive generator in accordance with claim 6 wherein:
the alternating current generator rotor has two poles and the generator with a permanent magnet rotor has twelve poles.

18. An integrated drive generator in accordance with claim 7 wherein:
the alternating current generator rotor has two poles and the generator with a permanent magnet rotor has twelve poles.

19. An integrated drive generator in accordance with claim 8 wherein:
the alternating current generator rotor has two poles in the generator with a permanent magnet rotor has twelve poles.

20. An integrated drive generator in accordance with claim 9 wherein:
the alternating current generator rotor has two poles and the generator with a permanent magnet rotor has twelve poles.

21. An integrated drive generator in accordance with claim 10 wherein:
the alternating current generator rotor has two poles and the generator with a permanent magnet rotor has twelve poles.

22. An integrated drive generator in accordance with claim 11 wherein:
the alternating current generator rotor has two poles and the generator with a permanent magnet rotor has twelve poles.

23. An integrated drive generator in accordance with claim 12 wherein:
the alternating current generator rotor has two poles and the generator with a permanent magnet rotor has twelve poles.

* * * * *